(12) United States Patent
Furusawa

(10) Patent No.: US 9,210,097 B2
(45) Date of Patent: Dec. 8, 2015

(54) CENTRAL-OFFICE TERMINATION APPARATUS OF ADAPTIVELY CHANGING CONNECTION TO SUBSCRIBER-TERMINAL TERMINATOR AND PATH SWITCHING METHOD

(71) Applicant: Oki Electric Industry Co., Ltd., Tokyo (JP)

(72) Inventor: Satoshi Furusawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/309,405

(22) Filed: Jun. 19, 2014

(65) Prior Publication Data

US 2015/0063811 A1    Mar. 5, 2015

(30) Foreign Application Priority Data

Sep. 2, 2013 (JP) ................. 2013-180982

(51) Int. Cl.
*H04J 14/00* (2006.01)
*H04L 12/863* (2013.01)
*H04J 14/08* (2006.01)
*H04Q 11/00* (2006.01)
*H04L 12/751* (2013.01)

(52) U.S. Cl.
CPC ............ *H04L 47/6295* (2013.01); *H04J 14/08* (2013.01); *H04Q 11/0067* (2013.01); *H04L 45/08* (2013.01); *H04Q 2011/0064* (2013.01)

(58) Field of Classification Search
CPC ..... H04L 47/6295; H04L 45/08; H04J 14/08; H04J 14/023; H04J 14/0232; H04J 14/0242; H04J 14/0245; H04J 14/0246; H04J 14/025; H04J 14/0239; H04J 14/0247; H04J 14/0252; H04J 14/0267; H04J 14/0269; H04J 14/028; H04J 14/0282; H04J 14/0284; H04Q 11/0067; H04Q 2011/0064

USPC ................................. 398/66, 70, 71
See application file for complete search history.

(56) References Cited

U.S. PATENT DOCUMENTS 7,738,490 B2 * 6/2010 Kim et al. ................ 370/468
8,665,724 B2 * 3/2014 Stanwood et al. ........ 370/235
8,824,287 B2 * 9/2014 Carlstrom ............... 370/230.1

(Continued)

FOREIGN PATENT DOCUMENTS

JP    H10-229404 A    8/1998
JP    2011-055407 A    3/2011

OTHER PUBLICATIONS

IEEE Computer Society "Part 3: Carrier Sense Multiple Access with Collision Detection (CSMA/CD) Access Method and Physical Layer Specifications, Amendment 1: Physical Layer Specifications and Management Parameters for 10Gb/s Passive Optical networks" IEEE Standard for Information technology—Telecommunications and information exchange between systems—Local and metropolitan area networks—Specific requirements, Oct. 30, 2009.

*Primary Examiner* — M. R. Sedighian
(74) *Attorney, Agent, or Firm* — Rabin & Berdo, P.C.

(57) ABSTRACT

A central-office termination apparatus includes plural termination devices and a termination device distributor. Each termination device includes a buffer, a subscriber-terminal terminator distributor and a scheduler. The buffer has a through queue and one or more switching queues. The subscriber-terminal terminator distributor transfers a packet meant for one subscriber-terminal terminator under switching to the switching queue, and transfers another packet meant for another subscriber-terminal terminator not under switching to the through queue. The scheduler reads out packets from the switching and through queues. The termination device distributor transfers a received packet to a termination device having the subscriber-terminal terminator registered for which that packet is meant.

6 Claims, 5 Drawing Sheets

(56) References Cited

U.S. PATENT DOCUMENTS

| | | | |
|---|---|---|---|
| 8,824,899 B2 * | 9/2014 | Yamashita | 398/168 |
| 8,948,595 B2 * | 2/2015 | Kazawa et al. | 398/67 |
| 8,989,009 B2 * | 3/2015 | Xiong | 370/236 |
| 2013/0201831 A1 * | 8/2013 | Tal et al. | 370/235 |

* cited by examiner

FIG. 4

| LLID | ONU |
|------|-----|
| 10 | 1 |
| ⋮ | ⋮ |

TIME I

| LLID | OSU |
|------|-----|
| 10 | 1 |
| ⋮ | ⋮ |

TIME II

| LLID | OSU |
|------|-----|
| 10 | 2 |
| ⋮ | ⋮ |

TIME I

| LLID | QUEUE |
|------|-------|
|      |       |
|      |       |

TIME III

| LLID | QUEUE |
|------|-------|
| 10   | 1     |
|      |       |

TIME IV

| LLID | QUEUE |
|------|-------|
|      |       |
|      |       |

212

CENTRAL-OFFICE TERMINATION APPARATUS OF ADAPTIVELY CHANGING CONNECTION TO SUBSCRIBER-TERMINAL TERMINATOR AND PATH SWITCHING METHOD

BACKGROUND OF THE INVENTION

1. Field of the Invention

The present invention relates to a central-office termination apparatus capable of adaptively changing connection to a subscriber-terminal terminator and a path switching method of changing connection between a subscriber-terminal terminator and central-office termination apparatuses.

2. Description of the Background Art

Recently, in order to provide high-speed broadband service to private premises, services, called an FTTH (Fiber To The Home), using optical fiber transmission lines in transmission channels has been developed. In the provision of the broadband services using the FTTH, an optical access network called a passive optical network (PON) for subscriber terminals is frequently applied.

The PON is configured so that a single central-office termination apparatus, e.g. an optical line terminal (OLT) and a plurality of subscriber-terminal terminators, e.g. optical network units (ONUs) are connected by means of a single optical cable split by an optical passive device called an optical splitter or coupler. In the PON, the optical fiber or OLT is commonly used by a plurality of subscriber terminals to economically provide the FTTH services.

As a sort of PON, there is so-called 10-Gigabit Ethernet (Trademark) PON (10G-EPON) as referred to in IEEE (Institute of Electrical and Electronics Engineers), Std 802.3av-2009. In that sort of PON, a Time Division Multiple Access (TDMA) technique is applied to communication from ONUs to an OLT, i.e. upstream communication, in order to avoid collision of signals transmitted from the ONUs with each other. The PON using the TDMA technique is often called a TDM-PON.

In response to prospective increase of communication demand in optical access networks, research and development are conducted on a WDM (Wavelength Division Multiplexing)/TDM-PON as one of the next generation PONs using transmission rate exceeding 10 Gbps. The WDM/TDM-PON constructs a plurality of TDM-PONs on a single PON infrastructure by the WDM technique, as refer to Japanese patent laid-open publication No. 2011-55407. By means of the TWDM-PON, the transmission capacity of the PON infrastructure can be increased.

The OLT in the TWDM-PON disclosed in Japanese patent laid-open publication No. 2011-55407 is provided with a plurality of optical transmitter/receivers and a controller for controlling the TWDM-PON. The optical transmitter/receivers are connected to a plurality of ONUs via an optical coupler.

In the upstream communication, receiving wavelengths are fixedly allocated to the optical transmitter/receivers of the OLT so as not to overlap with each other between the optical transmitter/receivers. In that solution, the transmission wavelengths of optical transmitter/receivers of the ONU are adapted changeable, thereby adaptively switching connections between the optical transmitter/receivers of the OLT and the ONU. In a downstream communication from the OLT to the ONU, likewise the upstream communication, the transmission wavelengths are fixedly allocated to the optical transmitter/receivers of the OLT, and the reception wavelengths of the optical transmitter/receivers of the ONU are adapted changeable, thereby adaptively switching connections between the optical transmitter/receivers of the OLT and the ONU. Thus, the TWDM-PON is advantageous in load distribution responsive to traffic fluctuation, higher reliability by path switching diversity during failure and power saving by sleep of the optical transmitter/receivers and device circuitry during low load.

In the TWDM-PON, when the connections of the OLT to the ONUs are adaptively switched in the downstream communication, the switching of the optical transmitter/receivers of the OLT and the switching of the reception wavelengths of the ONU are carried out. During a switching period of time until the reception wavelength of the ONU is switched to a new wavelength, the ONU cannot receive a packet of the downstream communication, i.e. downstream packet. However, in a multimedia application, it is preferable that packet loss would not occur during the switching period of time, and thus uninterrupted switching process is required.

Therefore, in order to avoid packet loss in the downstream communication during the switching period of time, it is necessary that the ONUs are adapted for buffering packets meant for that ONU currently under switching.

In a solution proposed for buffering inputted packets and switching a communication path, a buffer is arranged at the stage in front of a switch for switching a path and the switch switches the path in accordance with the destinations of inputted packets, refer to Japanese patent laid-open publication No. 229404/1998.

In the TWDM-PON, the OLT identifies downstream packets in terms of respective ONUs, and then, distributes the packets to optical transmitter/receivers to which the transmission wavelengths corresponding to the reception wavelengths of the respective ONUs are allocated.

When the configuration disclosed in Japanese patent laid-open publication No. 229404/1998 is applied to carrying out uninterrupted path switching in the TWDM-PON, it would be necessary to provide the buffers at the stage in front of the switch correspondingly in number to the ONUs contained in the TWDM-PON. Therefore, if a lot of ONUs are contained in the system, circuit scale is increased. Since the buffer needs its capacity sufficient for storing packets receivable during the switching period of time, if the time for the switching is lengthened, it would be necessary to increase the buffer capacity. The increase of the circuit scale or the buffer capacity would cause a problem in implementing the system.

By contrast, in a system to which a common buffer scheme commonly using a buffer is applied, as the number of the contained ONUs is increased, information for managing addresses of the buffer would be increased. Therefore, if a lot of ONUs are contained in the system, a memory with large capacity is required specifically for managing the addresses, thus also causing a problem in implementing the system.

SUMMARY OF THE INVENTION

It is therefore an object of the present invention to provide an OLT capable of adaptively changing connection to an ONU, and a path switching method of adaptively changing connection between an ONU and an OLT, free from packet loss even when many ONUs are contained in the system, without increase of circuit scale.

In accordance with the present invention, a central-office termination apparatus, or an optical line terminal (OLT), comprises a plurality of termination devices, or optical subscriber units (OSUs), and an OSU distributor. Each of the OSUs includes a buffer, a subscriber-terminal terminator distributor, or an optical network unit (ONU) distributor, and a scheduler. The buffer includes a through queue and one or more switching queues. The ONU distributor transfers a packet destined for one ONU under switching to the switching queue, and transfers another packet destined for another ONU not under switching to the through queue. The scheduler reads out packets from the switching and through queues. The OSU distributor transfers a received packet to an OSU having the ONU registered for which the packet is destined.

Further in accordance with the invention, a path switching method to be performed in a telecommunications network provided with the above-described OLT comprises the following steps. The OSU distributor changes an OSU, to which a packet destined for the ONU under switching is to be sent, from the OSU on which the ONU under switching is registered, to an OSU on which the ONU under switching is to be registered. The ONU distributor provided in the OSU on which the ONU under switching is to be registered references a learning table, and transfers, when the ONU under switching has been learned, a packet destined for the ONU to a process queue that has been learned, or transfers, when the ONU under switching has not been learned, the packet destined for the ONU to a process queue not in use to register the process queue on the learning table. After a packet destined for the ONU under switching and stored in the OSU on which the ONU under switching is registered has run out, the OSU to which the OSU on which the ONU under switching has been registered is switched starts transmission of a packet destined for the ONU under switching. After the packet destined for the ONU under switching and stored in the process queue has run out, the ONU under switching is released from the learning table, and a packet is transmitted via the through queue.

According to the present invention, the OLT and path switching method can restrain or minimize the number of the ONUs on which the switching can simultaneously be carried out, and provide the switching queues holding packets during the switching fewer in number than the ONUs contained in the system.

In addition, since the number of the queues is reduced, the memory capacity required for address management of the buffer can be reduced. Accordingly, uninterruptedly switchable OLTs can be economically provided.

BRIEF DESCRIPTION OF THE DRAWINGS

The objects and features of the present invention will become more apparent from consideration of the following detailed description taken in conjunction with the accompanying drawings in which:

FIG. 4 illustrates an example of the content of the LLID identifier table shown in FIG. 1;

FIGS. 5A and 5B illustrate examples of the content at times I and II of the LLID allocation table shown in FIG. 1; and FIGS. 6A, 6B and 6C illustrate examples of the content at times I, III and IV of the learning table showing in FIG. 1.

DESCRIPTION OF THE PREFERRED EMBODIMENT

An illustrative embodiment of the present invention will be described with reference to the figures. The figures conceptually or schematically show the constituent elements to the extent to which the invention is understandable. The preferred embodiment of the present invention will be described with the numerical or other conditions as preferred exemplification. Therefore, the present invention is not to be understood restrictive to the specific embodiment or examples. Those skilled in the art may change or modify the illustrative embodiment so as to accomplish the advantages of the present invention without departing from the scope and spirit of the invention. In the figures, part of the circuitry not directly relevant to understanding of the present invention is not shown, and detailed description thereof will not be made in order to avoid redundancy.

Figure 1:
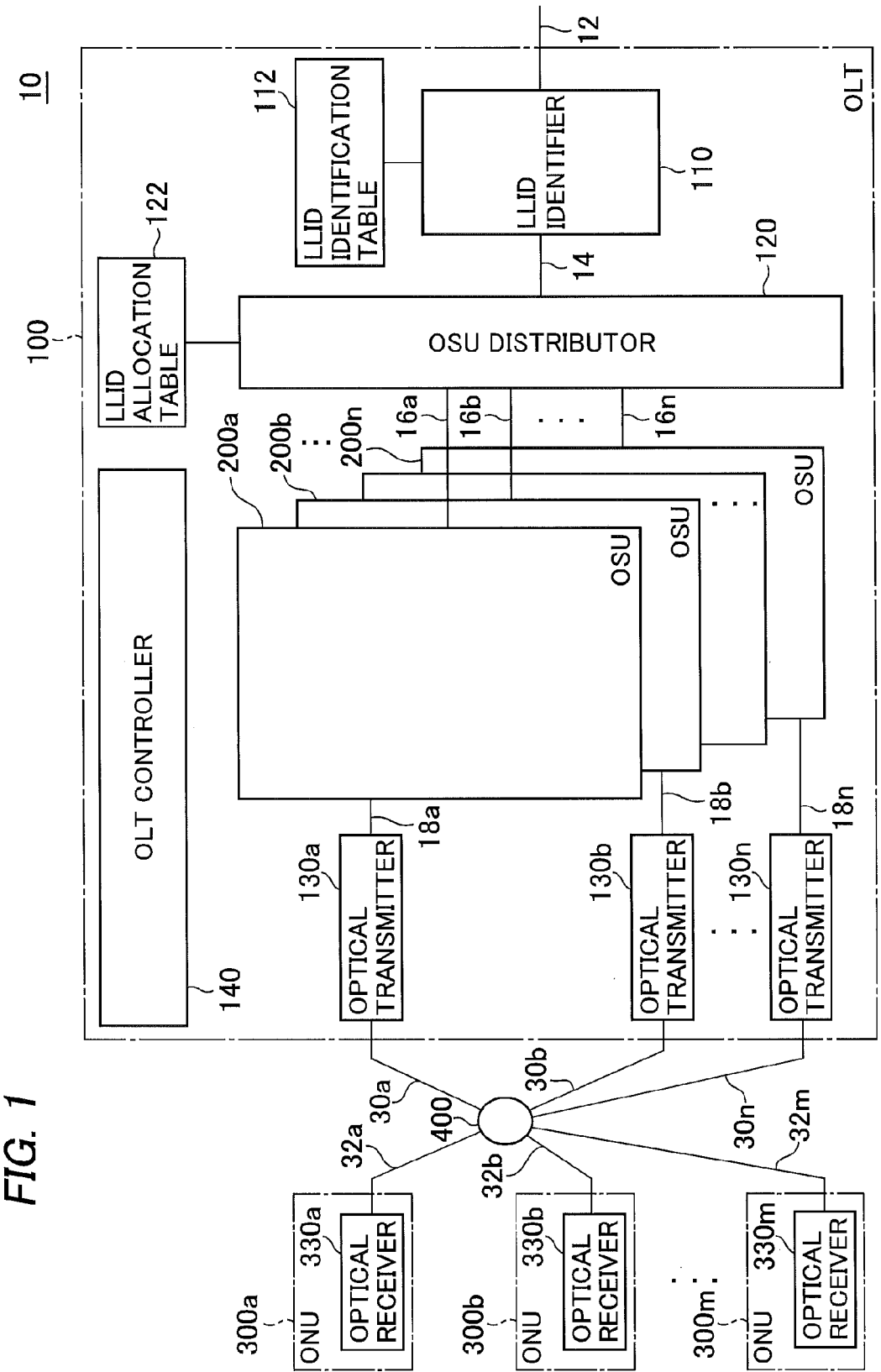
FIG. 1 is a schematic block diagram showing a TWDM-PON according to a preferred embodiment of the present invention.

With reference to FIG. 1, an example of the configuration of a TWDM-PON including an OLT of the present invention will be described. FIG. 1 is a schematic block diagram showing the TWDM-PON. The TWDM-PON is an optical access network using a PON system. In the TWDM-PON, downstream signals from the OLT to ONUs and upstream signals from the ONUs to the OLT are transmitted and received. The upstream and downstream signals include data signals transmitted/received between an upper-side or host network, not shown, connected to the OLT and a user terminal, not shown, connected to the ONU, and a control signal for use in establishing a PON link. Hereinafter, the data signal (often referred to as a downstream packet) contained in the downstream signal will be mainly described, and the control signals contained in the upstream and downstream signals will not so often focused.

The TWDM-PON 10 includes a single OLT 100, a plurality of ONUs 300a to 300m, where m is an integer equal to or more than two, and an optical splitter 400 serving as an optical passive element. The OLT 100 and optical splitter 400, as well as the ONU 300a to 300m and optical splitter 400 are respectively interconnected by optical fiber lines 30a to 30n, and 32a to 32m.

The OLT 100 includes an LLID (Logical Link Identification) identifier 110, an OSU (Optical Subscriber unit) distributor 120, a plurality of OSUs 200a to 200n, where n is an integer equal to or more than two, a plurality of optical transmitter 130a to 130n and an OLT controller 140, which are interconnected as illustrated.

The LLID identifier 110 is connected to the OSU distributor 120. The LLID identifier 110 reads information of a downstream packet 12 inputted from the upper-side network to identify an ONU for which the packet is to be destined. For instance, as the identifying information of a downstream packet 12, a virtual LAN (VLAN) ID (VID) contained in a packet (frame) of Ethernet (Trademark) may be used. Note that signals, data or packets are designated with the reference numerals of connections on which they are conveyed. The LLID identifier 110 has an LLID identification table 112 for use in correlating a VID with an LLID. Basically, LLIDs are correlated with connected ONUs on a one-to-one basis. Therefore, the LLID identifier 110 can use the LLID identification table 112 to identify a destined ONU 300 from the VID of a downstream packet 12. The LLID identifier 110 adds to the downstream packet the LLID correlated with the ONU 300 for which the packet is destined and transfers as the downstream packet 14 to the OSU distributor 120.

The OSU distributor 120 is connected to the plurality of OSUs 200a to 200n through signal lines 16a to 16n. In the TWDM-PON of the illustrative embodiment, each of the ONUs 300a to 300n may be registered on one of the plurality of OSUs 200a to 200n. The OSU distributor 120 has an LLID allocation table 122 for use in correlating the LLIDs with the OSUs. The OSU distributor 120 references the LLID allocation table 122 with the LLID of the received downstream packet 14 to identify an OSU 200 on which the ONU 300 for which the packet is destined is recorded. The OSU distributor 120 transfers the downstream packet 14 to the identified OSU 200.

The OSUs 200a to 200n are respectively connected to the optical transmitters 130a to 130n through signal lines 18a to 18n on a one-to-one basis. To the optical transmitters 130a to 130n, wavelengths λ1 to λn, different from each other, are fixedly allocated respectively. The optical transmitters 130a to 130n are connected to the ONUs 300a to 300m via the optical splitter 400.

The downstream packet 16 inputted to the OSU 200 is transmitted to the ONU 300, for which the packet is destined, via the connected optical transmitter 130 on the wavelength allocated to that transmitter. Since the OSUs 200a to 200n are respectively connected to the optical transmitter 130a to 130n via signal lines 18a to 18n on a one-to-one basis, the transmission wavelength of downstream packets is determined in accordance with the OSU on which the ONU for which the packet is destined is recorded. Therefore, in the following description, the wavelengths allocated to the optical transmitters 130a to 130n connected to the OSUs 200a to 200n are often called the wavelengths allocated to the OSUs 200a to 200n.

Figure 2:
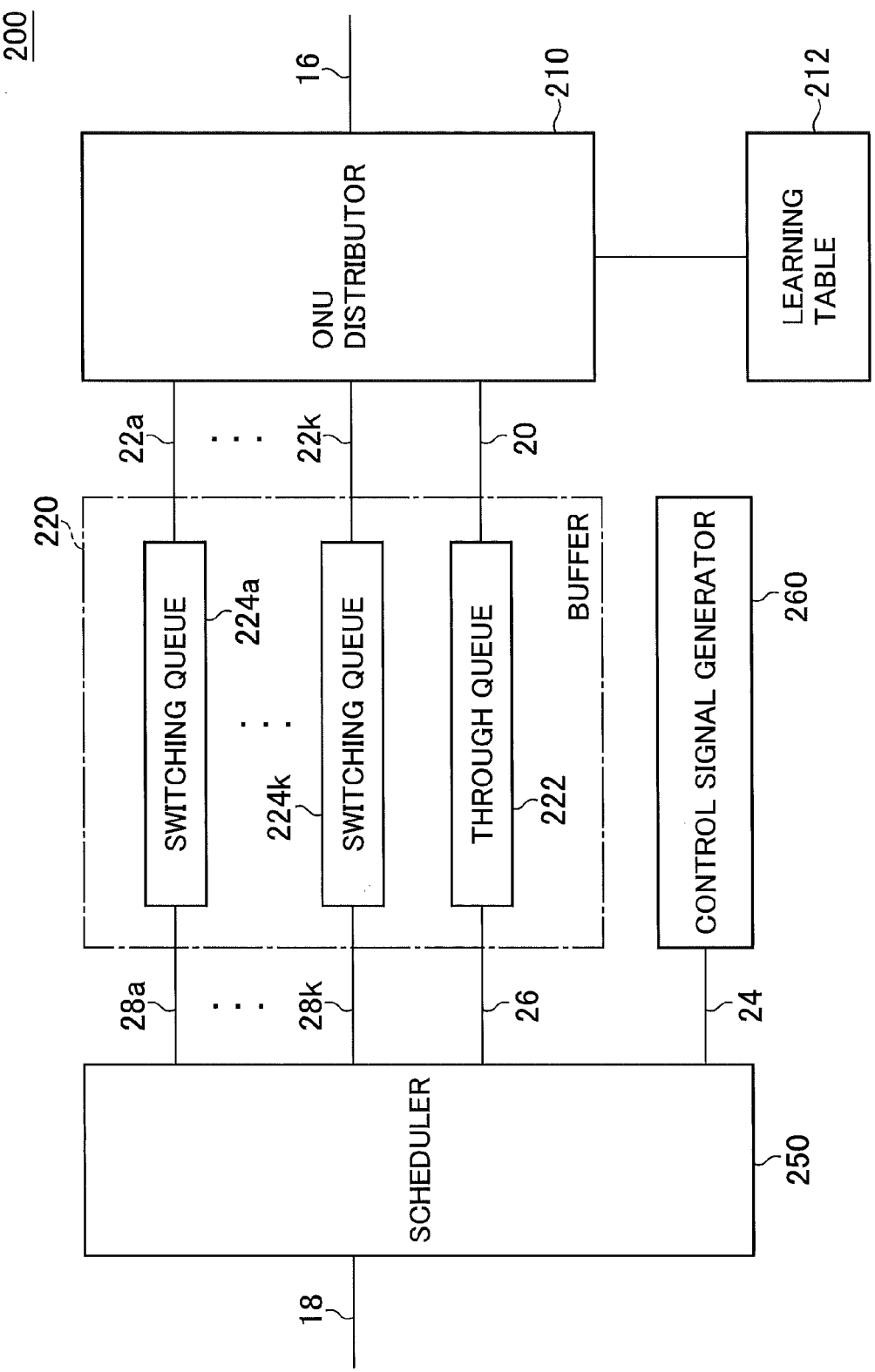
FIG. 2 is a schematic block diagram showing the configuration of an OSU in FIG. 1.

Each of the OSUs 200a to 200n includes an ONU distributor 210, a buffer 220, a scheduler 250 and a control signal generator 260, which are interconnected as shown in FIG. 2. The buffer 220 includes a single through queue 222 and one or more switching queues 224a to 224k, where k is an integer equal to or more than two, arranged in parallel to each other. The number k of the switching queues is correspondent with the number of paths or routes that can simultaneously be switched. It is then preferable that a plurality of switching queues 224 are arranged. If the number k of the switching queues 224 is increased, the circuit scale is increased. It is therefore preferable that the number k of the switching queues 224 is set less than the number of the ONUs 300 registerable on the OSUs 200 to restrain or minimize the increase of the circuit scale.

When the destination of packets 16 is not an ONU under switching, namely, not an ONU that is being registered on an OSU different from the OSU on which the ONU is currently registered, the ONU distributor 210 transfers packets such as packets 20 to the through queue 222. By contrast, when the destination of packets 16 is an ONU under switching, the ONU distributor 210 transfers the packets as one of the packets 22a to 22k to any of the switching queues 224a to 224k. It is determined by referencing a learning table 212 to which of the plurality of switching queues the ONU distributor 210 should transfer a packet meant for an ONU under switching. When an ONU under switching is unlearned, i.e. that ONU is not registered on, or included in, the learning table, the ONU distributor 210 transfers an unused switching queue 224 to that ONU. In turn, the ONU distributor 210 registers or records the switching queue 224 to which the packet has been sent on the learning table 212, and sets the queue as finished in learning. When the ONU under switching is set as finished in learning, the ONU distributor 210 transfers the packet to the switching queue 224 registered on the learning table 212.

The control signal generator 260 generates a control signal such as gate signal 24 for use in establishing a PON link. Switching of the reception wavelength in the ONU can be directed by using the control signal 24.

The through queue 222 and the plurality of switching queues 224a to 224k are responsive to packets, when inputted, to issue one of corresponding transmission requests 26, and 28a to 28k to the scheduler 250. The scheduler 250 is operative in response to a transmission request from the queues 222 and 224a to 224k or a request for transmitting a control signal 24 to arrange its output and transmits a downstream signal 18 to the ONU via the optical transmitter.

Referring back to FIG. 1, the OLT controller 140 controls the entire OLT and the OSU installed in the OLT. For instance, the OLT controller 140 carries out updating of the LLID identification table 112 and LLID allocation table 122. The OLT controller 140 also carries out monitoring of traffic passing through the OLT and determines the timing and content of the path switching. In addition, the OLT controller 140 monitors readout of the OSU from the scheduler 250.

Moreover, when changing the OSU on which an ONU under switching will be registered, the OLT controller 140 releases the old OSU currently under switching, i.e. the OSU having the ONU registered so far, registers the ONU on a new OSU to which the registration is to be switched or shifted, and notifies the new OSU of the fact that that OSU is registered as a new OSU to which the ONU under switching is registered. The notification may be directed to the OSU directly by the OLT controller 140 or may be added to the packet, which is in turn transmitted to that OSU.

Each of the ONUs 300a to 300m includes an optical receiver 330 for receiving downstream packets. The optical receiver 330 has its reception wavelength variably set so as to receive downstream packets on a wavelength allocated to the OSU on which the ONU is thus registered.

The TWDM-PON 10 of the illustrative embodiment may be configured, except for the configuration described above, in a similar way to conventional TWDM-PONs.

Figure 3:
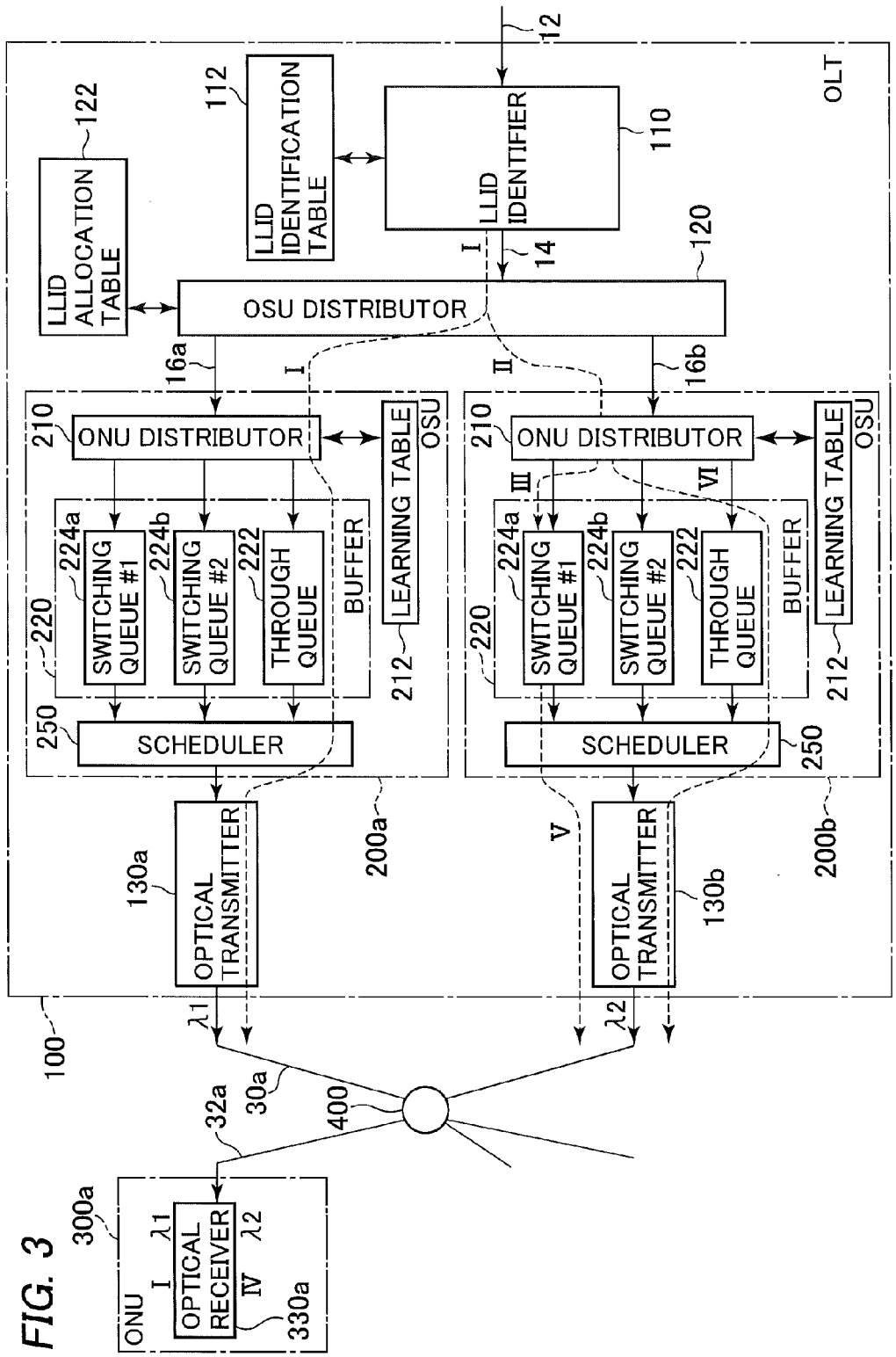
FIG. 3 is a schematic block diagram useful for understanding a path switching method in the preferred embodiment.

With reference to FIG. 3, it will be described how to switch paths or routes. FIG. 3 is a schematic block diagram useful for understanding the path switching method in the illustrative embodiment. In the disclosure, like components are designated with the same reference numerals. With reference to FIG. 4 also, the LLID identification table 112 comprises the storage fields for storing data of the ONUs 36 made in association with data of the LLIDs 34. In the illustrative embodiment, such data may be numeral keys specific to the LLIDs or ONUs. For instance, the LLID of the first ONU 300a is set to a numeral key "10". More specifically, on the LLID identification table 112, FIG. 4, in a line, or record, including the field of the LLID 34 set to a numeral key "10", a numeral key "1" is allocated to the ONU 36.

At the time point I, the first ONU 300a is registered on the first OSU 200a. More specifically, as shown in FIG. 5A, on the LLID allocation table 122, in a line including the field of the LLID 38 set to the numeral key "10", the numeral key "1" is allocated to the OSU 40. Therefore, the OSU distributor 120 transfers the packet 14 as a packet 16a for the first ONU 300a to the first OSU 200a. This packet 14 will be transmitted in the form of downstream signal 32a on the wavelength λ1 to the first ONU 300a via the through queue 222, scheduler 250 and first optical transmitter 130a in the first OSU 200a.

Now, the OSU, on which the first ONU 300a under switching is to be registered, is switched or shifted from the first OSU 200a to the second OSU 200b. Such a switching may be carried out, for example, for the purpose of distributing communication load or traffic.

At the time point II, as shown in FIG. 5B, the OLT controller 140 updates the LLID allocation table 122 so as to allocate the OSU 40 in a line, or entry, including the field of the LLID 38 set to the numeral key "10" to the numeral key "2". After updating the LLID allocation table 122, the packet 12 destined for the first ONU 300a transmitted from the upper-side network to the OLT 100 is transferred accordingly to the second OSU 200b as a packet 16b.

At that time, since the first ONU 300a has its wavelength set to λ1, it cannot receive the downstream signal from the second OSU 200b on the reception wavelength is λ2. Accordingly, it is necessary for the first OSU 200a to direct the first ONU 300a to switch its reception wavelength to λ2.

However, there is a possibility that packets destined for the first ONU 300a remain stored in the first OSU 200a while untransmitted. Moreover, the switching of the reception wavelength in the first ONU 300a may require a significant period of time.

Accordingly, it is preferable to take into account a time that would be taken for the wavelength switching in the ONU 300a and a time that would be taken until packets remaining stored in the first OSU 200a have run out to direct the first ONU 300a so as to render the wavelength switching timed with those times.

After the time point II, the second OSU 200b receives the packet meant for the first ONU 300a, and then decides whether or not the first ONU 300a is an ONU under switching. At the time point II, when the LLID allocation table 122 is updated, the OLT controller 140 notifies the second OSU 200b that the first ONU 300a is an ONU under switching. By this notification, the ONU distributor 210 in the second OSU 200b recognizes that the first ONU 300a is an ONU under switching.

Subsequently, at the time point III, the ONU distributor 210 decides whether or not the first ONU 300a has been learned in the learning table 212. In the instant example, the first ONU 300a is not registered as shown in FIG. 6A, and hence the distributor 210 decides that the first ONU 300a is unlearned. The ONU distributor 210 transfers the packet 16b meant for the unlearned ONU to one of the unused switching queues to make the learning table 212 learn that switching queue. In this example, as an unused switching queue, the first switching queue 224a is chosen. For choosing a switching queue, any of the unused switching queues may be selected in a priority of ascending order of the queue numbers or at random, for example.

After the first switching queue 224a is chosen, the packet 16b meant for the first ONU 300a is transferred to the switching queue 224a #1, and, as shown in FIG. 6B, the fields of the LLID 42 and queue 44 in a blank line on the table 212 have the numeral keys "10" and "1" respectively recorded. Consequently, the first ONU 300a has its state indicated as learned. After the first ONU 300a has become the learned state, the ONU distributor 210 references the learning table 212 to transfer the packet meant for the first ONU 300a to the first switching queue 224a.

Subsequently, at the time point IV, the reception wavelength of the first ONU 300a is switched from λ1 to λ2. The timing of the wavelength switching is adjusted so that packets 16a meant for the first ONU 300a remaining stored in the first OSU 200a have run out by the time point IV. After the switching of the reception wavelength in the first ONU 300a is completed, a control signal such as gate signal is transmitted from the second OSU 200b to the first ONU 300a, and then a response from the first ONU 300a is received. Thus, the link of the second OSU 200b to the first ONU 300a is established.

After that, at the time point V, the scheduler 250 allows the packets 16b stored in the first switching queue 224a to be transmitted toward the first ONU 300a.

At the time point VI, the learning entry is released. The scheduler 250 adjusts the timing of reading out the queue so that the packets 16b stored in the first switching queue 224a run out by the time point VI. The release of the learning entry is carried out by deleting, as shown in FIG. 6C, the values "10" and "1" specifying the first ONU 300a and the first switching queue 224a, respectively, from the learning table 212. The first ONU 300a is set to an object not under switching.

After the learning entry is released and the first ONU 300a is set to an object not under switching, the packets 16b meant for the first ONU 300a is transferred to the optical transmitter 130b via the through queue 222 and scheduler 250 in the second OSU 200b.

If the OSU, on which the second ONU 300b under switching is to be registered, is switched from the first OSU 200a to the second OSU 200b during the path switching of the first ONU 300a, it is also possible to carry out the path switching by the above-described steps. In such a case, since the first switching queue 224a has been used, the second switching queue 224b may be used as an unused switching queue. The OLT controller 140 monitors how the path switching proceeds, and restrains the number of the ONUs on which wavelength switching can simultaneously be carried out so as not to exceed the number of the switching queues.

In accordance with the OLT and the path switching method of the present invention, it is possible to restrain the number of the ONUs on which the switching can simultaneously be carried out and to provide the switching queues for holding packets during the switching fewer in number than the ONUs provided in the system. Since the number of queues is thus reduced, it is possible to save the memory capacity required for address management of the buffer. Accordingly, it is possible to economically provide uninterruptedly switchable OLTs.

Although the example is described above in which each ONU under switching uses one switching queue, the present invention may not be restricted to that specific example. For instance, the path switching of a plural ONU having wavelength switching time equal to each other can be carried out by using one switching queue.

The illustrative embodiment described so far is directed to the TWDM-PON system. The OLT and the path switching method of the present invention may however not be restricted to the TWDM-PON system. The OLT and the path switching method can be applied in general telecommunications networks to path switching intended for load distribution or uninterrupted switching of a redundant or diversity path when failure occurs.

The entire disclosure of Japanese patent application No. 2013-180982 filed on Sep. 2, 2013, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What I claim is:

1. An optical line terminal (OLT) connectable to a plurality of optical network units (ONUs), the OLT comprising:
   an optical subscriber unit (OSU) distributor configured to receive a plurality of packets, each destined for one of the ONUs, input into the OLT, and to distribute the plurality of packets; and
   a plurality of OSUs configured to receive the distributed packets, each OSU including
      a buffer that includes a through queue and a switching queue,
      an ONU distributor configured to
         determine whether a destination of each distributed packet received by said each OSU is one of the ONUs that is registered in another one of the OSUs, transfer said each received distributed packet to the switching queue if the destination is registered in another one of the OSUs, and transfer said each received distributed packet to the through queue if the destination is not registered in any other one of the OSUs, and a scheduler configured to read out said each received distributed packet from the switching queue or the through queue.

2. OLT in accordance with claim 1, wherein the buffer of said each OSU has a plurality of switching queues including the switching queue of claim 1;

said each OSU further includes a learning table that has a number of the ONUs and a number of the switching queues registered therein, wherein each switching queue corresponds to one ONU;

upon determining that the destination of said each received distributed packet is registered in another one of the OSUs, and is registered in the leaning table of said each OSU, said each OSU transfers said each received distributed packet to one of the switching queues corresponding to the destination, upon determining that the destination of said each received distributed packet is registered in another one of the OSUs, and is not registered in the leaning table of said each OSU, said each OSU transfers said each received distributed packet to one of the switching queues not registered in the leaning table, and subsequently registers the one unregistered switching queue in the learning table thereof.

3. The OLT in accordance with claim 1, wherein the buffer of said each OSU has a plurality of switching queues including the switching queue of claim 1, and the plurality of switching queues of said each OSU are fewer in number than the plurality of ONUs.

4. The OLT in accordance with claim 1, wherein the buffer of said each OSU has a plurality of switching queues including the switching queue of claim 1, and the plurality of switching queues of said each OSU are larger in number than a number of the ONUs available for simultaneous wavelength switching.

5. The OLT in accordance with claim 1, further comprising:

a logical link identification (LLID) allocation table configured to register a number of the OSUs and a number of the ONUs, wherein each OSU corresponds to one ONU; and an OLT controller, wherein the OSU distributor distributes each of the plurality of packets to one of the plurality of OSUs by referring to the LLID allocation table, and the OLT controller controls a first one of the OSUs, on which one of the ONUs is registered, to de-register the one ONU, controls a second one of the OSUs to register the one ONU, and controls to update the LLID allocation table accordingly.

6. A method for an optical line terminal (OLT) to transfer a packet to one of a plurality of optical network units (ONUs), the OLT including a plurality of optical subscriber unit (OSUs), each OSU including a buffer that includes a through queue and a plurality of switching queues, and a learning table that has a number of the ONUs and a number of the switching queues registered therein, wherein each switching queue corresponds to one ONU, the method comprising:

receiving, by one of the OSUs, the packet as an input;

determining, by the one OSU, whether a destination of the packet is one of the ONUs that is registered in another one of the OSUs;

upon determining that the destination of the packet is not registered in any other one of the OSUs, transferring the packet to the through queue of the one OSU;

upon determining that the destination of the packet is registered in another one of the OSUs, determining, by the one OSU, whether the destination of the packet is registered in the learning table of the one OSU, and if the destination is registered in the leaning table of the one OSU, transferring the packet to one of the switching queues of the one OSU that corresponds to the destination, and if the destination is not registered in the leaning table of the one OSU, transferring the packet to one of the switching queues of the one OSU that is not registered in the leaning table thereof, and subsequently registers the one unregistered switching queue in the learning table thereof; and transferring the packet to the destination by reading out the packet from the buffer of the one OSU.

* * * * *